United States Patent Office 2,718,441
Patented Sept. 20, 1955

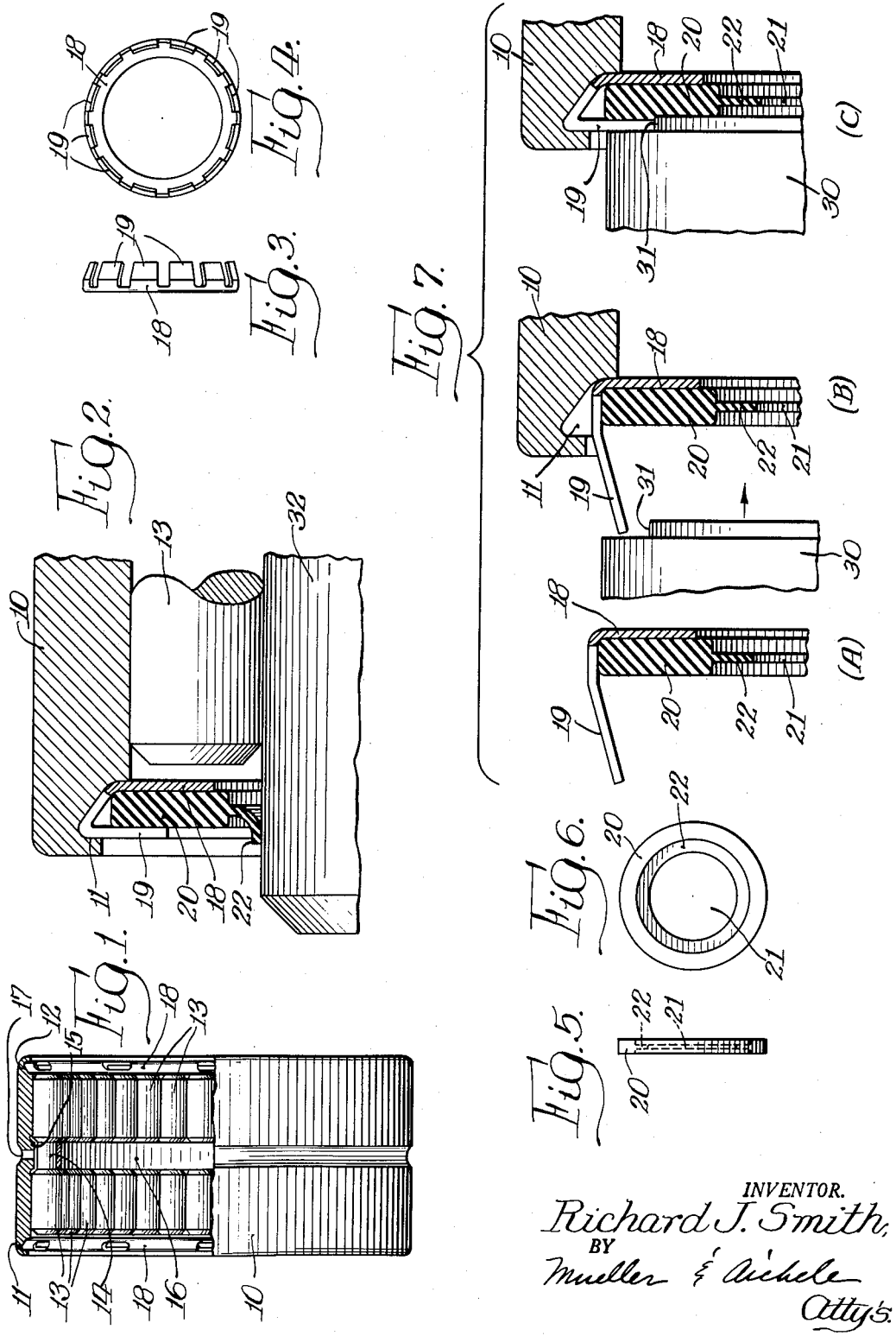

2,718,441

SELF-CONTAINED SEAL AND BEARING ASSEMBLY

Richard J. Smith, Valparaiso, Ind., assignor to McGill Manufacturing Company, Inc., Valparaiso, Ind., a corporation of Indiana Application January 21, 1954, Serial No. 405,429

3 Claims. (Cl. 308—187.2)

The present invention relates to bearing assemblies and more particularly to an improved bearing assembly that includes a self-contained sealing means for excluding dirt and for retaining grease or oil within the assembly.

Self-contained seals in bearings are known and are found generally in ball bearing assemblies. In such assemblies, the balls are held by the inner and outer races in such a manner that there is no appreciable axial motion between the races and, therefore, adequate seals can usually be provided since there is no possibility of the balls or races becoming jammed against the seals.

The usual roller bearing assembly consists essentially of an inner race and an outer race with a plurality of elongated rolls disposed in the annular space between the races. In order to support and prevent endwise movement of the rolls and to confine them between the races, the outer race is usually provided with a flange at each end. This type of roller bearing can usually be constructed to have no appreciable axial motion between the races, but due to the presence of the end flanges it is difficult to mount a self-contained seal in such assemblies.

In another type of roller bearing, the rolls are supported at respective restricted portions thereof intermediate their ends. These restricted portions of the rolls take up the longitudinal thrust so that no retainers or flanges are needed at the ends of the races. Since this type of bearing does not have end flanges, there is space for self-contained seals. However, there is usually some relative axial motion in the bearing between the races so as to render it difficult to provide a satisfactory seal that does not jam the bearing and yet which may be mounted easily and economically so as to perform a sealing function.

Copending application Serial Number 348,852, filed April 15, 1953, in the name of the present inventor entitled "Self-Contained Seal and Bearing Assembly," discloses and claims an improved sealing arrangement that is eminently suitable for use in the latter type of bearing discussed above in which there is a tendency for some relative axial motion between the races. The present invention, likewise, is primarily concerned with a satisfactory self-contained seal in the latter type of bearing assembly, although it will be apparent as the description proceeds that it may be applied to other types of bearings such as those discussed previously herein.

It is, accordingly, an object of the present invention to provide a bearing assembly, that may be of the roller bearing type in which the rolls are supported within the bearing at respective restricted portions intermediate the ends thereof, and which incorporates an improved self-contained sealing means for maintaining lubricant within the bearing and for excluding dirt and other extraneous and unwanted matter.

A further object of the invention is to provide such an improved bearing assembly that may be fabricated conveniently and economically.

A still further object of the invention is to provide such an improved sealed bearing assembly in which the sealing means is positively retained within the assembly and is not subject to failure due to internal pressures within the assembly.

Yet another object of the invention is to provide such an improved bearing assembly that incorporates an improved self-contained sealing means that is not subject to jamming even in the presence of axial motion between the bearing races.

A feature of the invention is the provision of an improved sealing means in a bearing which is firmly and rigidly maintained within an annular groove formed adjacent the open end of one of the races of the bearing.

Another feature of the invention is the provision in such a bearing of a retaining member with sealing means supported thereby, the retaining member having a series of bent-over peripheral prongs disposed in the annular groove in the race, and the groove having a particular shape to facilitate the insertion of and rigidly to retain the prongs therein.

Yet another feature of the invention is the provision of such an improved sealing means in which the resilient sealing washer has an annular portion of reduced section adjacent the central aperture therein to form a lip, the lip making contact with the shaft in the bearing and being displaced inwardly or outwardly depending upon the direction of the assembly of the shaft in the bearing. This precludes the need for facing the sealing washer, thus rendering the sealing means more efficient and less expensive.

The above and other features of the invention which are believed to be new are set forth with particularity in the appended claims. The invention itself, however, together with further objects and advantages thereof may best be understood by reference to the following description when taken in conjunction with the accompanying drawings in which:

Fig. 1 is a side view, partly in section, of a bearing assembly incorporating the present invention;

Fig. 2 is an enlarged sectional view of a fragment of the bearing of Fig. 1, illustrating various details of the invention;

Figs. 3 and 4 are side and end views respectively of one of the components of the invention;

Figs. 5 and 6 are side and end views respectively of another component of the invention; and Fig. 7 is a schematic representation of various steps used in assembling the improved sealed bearing unit of the invention.

The invention provides in a bearing assembly the combination of a cylindrical race having an annular groove formed therein adjacent an end thereof. A retaining member is supported by the race, and the retaining member has an annular bent-over portion forming a peripheral retaining channel, with the bent-over portion being disposed in the annular groove in the race. A disc-like sealing member is then retained within the annular retaining channel in coaxial relation with the retaining member.

Referring now to the drawings and in particular to Figs. 1–6, the illustrated embodiment of the sealed bearing assembly of the present invention includes an open-ended outer cylindrical race 10 having a pair of internal annular grooves 11, 12 formed in the bore thereof adjacent the open ends. These grooves, preferably, each have a substantially V-shaped cross section, with its innermost surface inclined to the inner surface of the race and with its outer surface extending at right angles to the inner surface of the race.

A plurality of rollers 13 are supported within race 10 and adjacent the race. Each of the rollers has an intermediate portion 14 of reduced section. An internal annular guide rail 15 is formed on the bore of the race intermediate the ends thereof, and the guide rail engages the intermediate portion 14 of each of the rollers. A resilient retaining ring 16 is provided for maintaining the intermediate portion of each of the rollers against guide rail 15. A plurality of lubricating apertures, such as aperture 17, are provided in race 10 and these apertures extend through guide rail 15 to the interior of the race.

A disc-like resilient metallic retaining member 18 (such as shown in Figs. 3 and 4) is provided at each end of the bearing. Retaining member 18 has a central aperture therein and has a plurality of bent-over prongs 19 extending from the periphery thereof. Each of the prongs has a substantially V-shaped configuration conforming with the shape of the annular grooves 11 and 12 in which they are disposed and these prongs have respective end portions extending parallel but spaced from the body of retaining member 18 to form an annular peripheral retaining channel.

A disc-like resilient sealing member 20 (such as shown in Figs. 5 and 6) is provided and may be composed of rubber or similar resilient sealing substance. The sealing member has a central aperture 21 therein of smaller diameter than the central aperture in the retaining ring, and the sealing member has an annular lip portion 22 of reduced thickness adjacent the central aperture 21 therein. The sealing member is firmly retained by the end portions of prongs 19 within the annular channel formed thereby and in coaxial relation with the retaining member.

As shown in Fig. 7, the sealing means of the sealed bearing assembly can be assembled and inserted in the bearing by a simple and convenient operation. In step A the retaining member 18 is provided with its bent-over prongs 19 extending outwardly therefrom at substantially 90° thereto, and the sealing member 20 is placed adjacent the retaining ring. In step B, the retaining member 18 and sealing member 20 are placed adjacent annular groove 11 in race 10 and a tool 30 is used to bend the prongs 19 into a V-shaped configuration. As shown in step C, tool 30 has a shoulder portion 31 which engages the respective ends of prongs 19 so that the prongs may be bent inwardly into a V-shaped configuration and forced upwardly into groove 11 in conformance with the shape of that groove. In this manner, the retaining member 18 is firmly held within the annular groove, and the sealing member 20 is rigidly mounted within the annular channel formed by the bent-over prongs 19.

The thin lip portion 22 of the sealing member 20 bears against the shaft 32 (Fig. 2) with which the bearing is associated. This lip has such a configuration that it bends either inwardly or outwardly depending upon the side from which the bearing is mounted on the shaft. This eliminates any need for facing the lip of the sealing member and provides an efficient seal despite any axial movement between the bearing and the shaft.

The invention provides, therefore, an improved sealed bearing assembly in which a sealing means is rigidly held in an annular groove in the bearing race to obviate any possibility of the sealing means being blown out by excessive lubricating pressures within the bearing. Moreover, the sealing means is composed of a pair of components that may be fabricated and assembled cheaply and conveniently so as to reduce the cost of the assembly to a minimum.

Under some conditions it is desirable to insert a metallic washer between the prongs 19 and the disc-like sealing member 20. This washer seats against the sealing member and serves the purpose of more rigidly holding the sealing member in place.

While a particular embodiment of the invention has been shown and described, modifications may be made, and it is intended in the appended claims to cover all such modifications as fall within the true spirit and scope of the invention.

I claim:

1. In a bearing assembly, the combination of a cylindrical race having an open end and having an internal annular groove formed therein adjacent such open end, said groove having a substantially V-shaped cross section with its innermost surface inclined to the inner surface of said race and with its outermost surface extending at right angles to the inner surface of said race, a disc-like retaining member having a central aperture therein and having a series of bent-over prongs extending from the periphery thereof and disposed in said annular groove, said prongs each having a configuration corresponding to said cross section of said annular groove, and said prongs having respective end portions extending parallel to said retaining member but spaced therefrom to form an annular retaining channel, and a disc-like sealing member retained in said annular retaining channel and having a central aperture therein of smaller diameter than the diameter of said aperture in said retaining member.

2. In a bearing assembly having an outer cylindrical race with at least one open end and an internal annular groove formed in the race adjacent the open end, the groove having a substantially V-shaped cross section with its innermost surface inclined to the inner surface of the race and with its outermost surface extending at right angles to the inner surface of the race, a plurality of rollers disposed adjacent the race and each of the rollers having an intermediate portion of reduced cross section, an internal annular guide rail formed on the race intermediate the ends thereof and engaging the intermediate portions of the rollers, and a retaining ring for maintaining the intermediate portions against the guide rail, the combination of a disc-like resilient metallic retaining member having a central aperture therein and having a plurality of bent-over prongs extending from the periphery thereof, and disposed in the annular groove in the race, said prongs each having a configuration corresponding to said cross section of the annular groove, and said prongs having respective end portions extending parallel to said retaining member but spaced therefrom to form an annular retaining channel, a disc-like resilient sealing member retained in said annular retaining channel and having a central aperture therein of smaller diameter than the diameter of said aperture in said retaining member, and said sealing member having an annular lip portion of reduced thickness adjacent the central aperture therein.

3. In a bearing assembly, the combination of a cylindrical race having an open end and having an internal annular groove formed therein adjacent such open end, said groove having a substantially V-shaped cross-section with its innermost surface inclined to the inner surface of said race and with its outermost surface extending at right angles to the inner surface of said race, a disc-like retaining member having a central aperture therein and having a series of bent-over prongs extending from the periphery of the body portion thereof and disposed in said annular groove, said prongs each having a configuration corresponding to said cross section of said annular groove, and said prongs having respective end portions extending parallel to the body portion of said retaining member but spaced therefrom to form an annular retaining channel, a resilient disc-like sealing member retained in said annular retaining channel and having a central aperture therein of smaller diameter than the diameter of said aperture in said retaining member, and said sealing member having an annular lip portion of reduced thickness adjacent the central aperture therein.

References Cited in the file of this patent

UNITED STATES PATENTS

| | | |
|---|---|---|
| 1,917,988 | Large | July 11, 1933 |
| 2,132,042 | Nelson | Oct. 4, 1938 |
| 2,208,700 | Murden | July 23, 1940 |
| 2,274,137 | Frauenthal et al. | Feb. 24, 1942 |
| 2,286,472 | Delaval-Crow | June 16, 1942 |
| 2,334,227 | Stallman | Nov. 16, 1943 |
| 2,355,805 | Koepp | Aug. 15, 1944 |

FOREIGN PATENTS

| | | |
|---|---|---|
| 508,640 | Great Britain | July 4, 1939 |